United States Patent [19]
Yoder

[11] Patent Number: 5,228,707
[45] Date of Patent: Jul. 20, 1993

[54] RETRACTABLE VEHICLE STEP

[75] Inventor: Clarence T. Yoder, Millersburg, Ind.

[73] Assignee: Carriage, Inc., Millersburg, Ind.

[21] Appl. No.: 746,949

[22] Filed: Aug. 16, 1991

[51] Int. Cl.$^5$ ................................................ B60R 3/00
[52] U.S. Cl. ........................................ 280/166; 182/88; 182/127
[58] Field of Search .................... 280/163, 164.1, 166, 280/164.2, 169; 248/277, 293, 429, 278; 182/96, 127, 88; 414/921, 537, 541, 549

[56] References Cited

U.S. PATENT DOCUMENTS

| | | | |
|---|---|---|---|
| 2,642,217 | 6/1953 | Jennings | 280/166 |
| 4,139,078 | 2/1979 | Keller | 280/166 |
| 4,623,160 | 11/1986 | Trudell | 280/166 |
| 4,685,858 | 8/1987 | Manning et al. | 280/166 |

Primary Examiner—Richard M. Camby
Attorney, Agent, or Firm—James D. Hall

[57] ABSTRACT

A step ladder assembly that moves back and forth from a storage area beneath the vehicle to an operation position in front of the vehicle entry way. The step ladder usually includes a pivotal stair case part and slide part fitted between rails carries by the vehicle undercarriage.

4 Claims, 3 Drawing Sheets

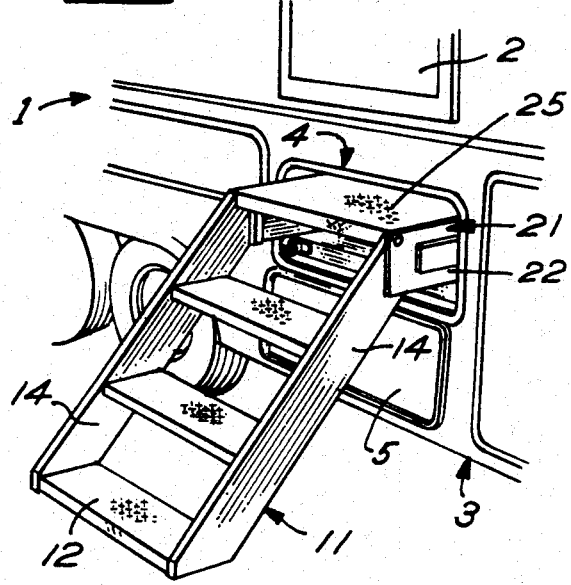
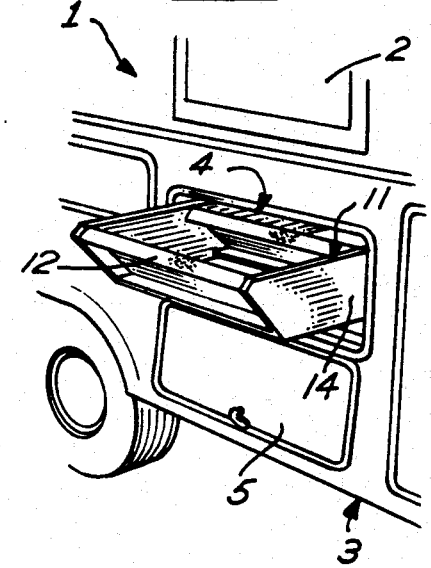
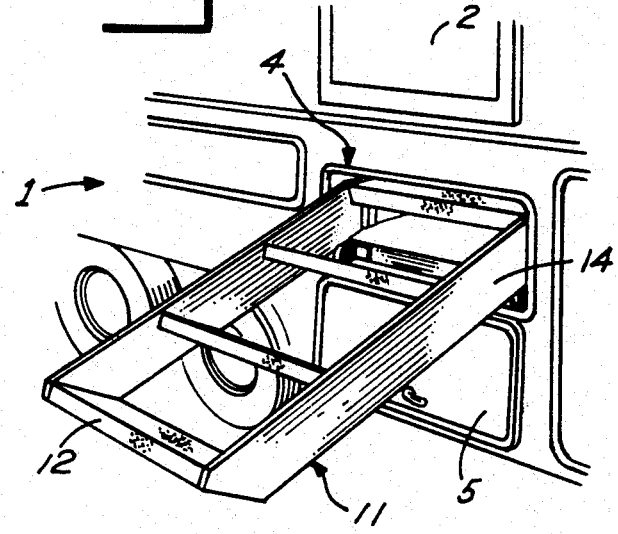
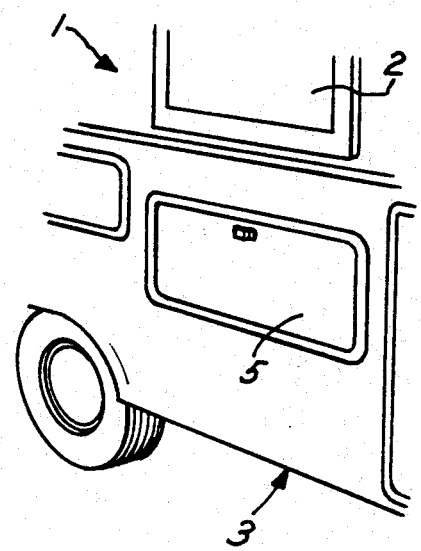

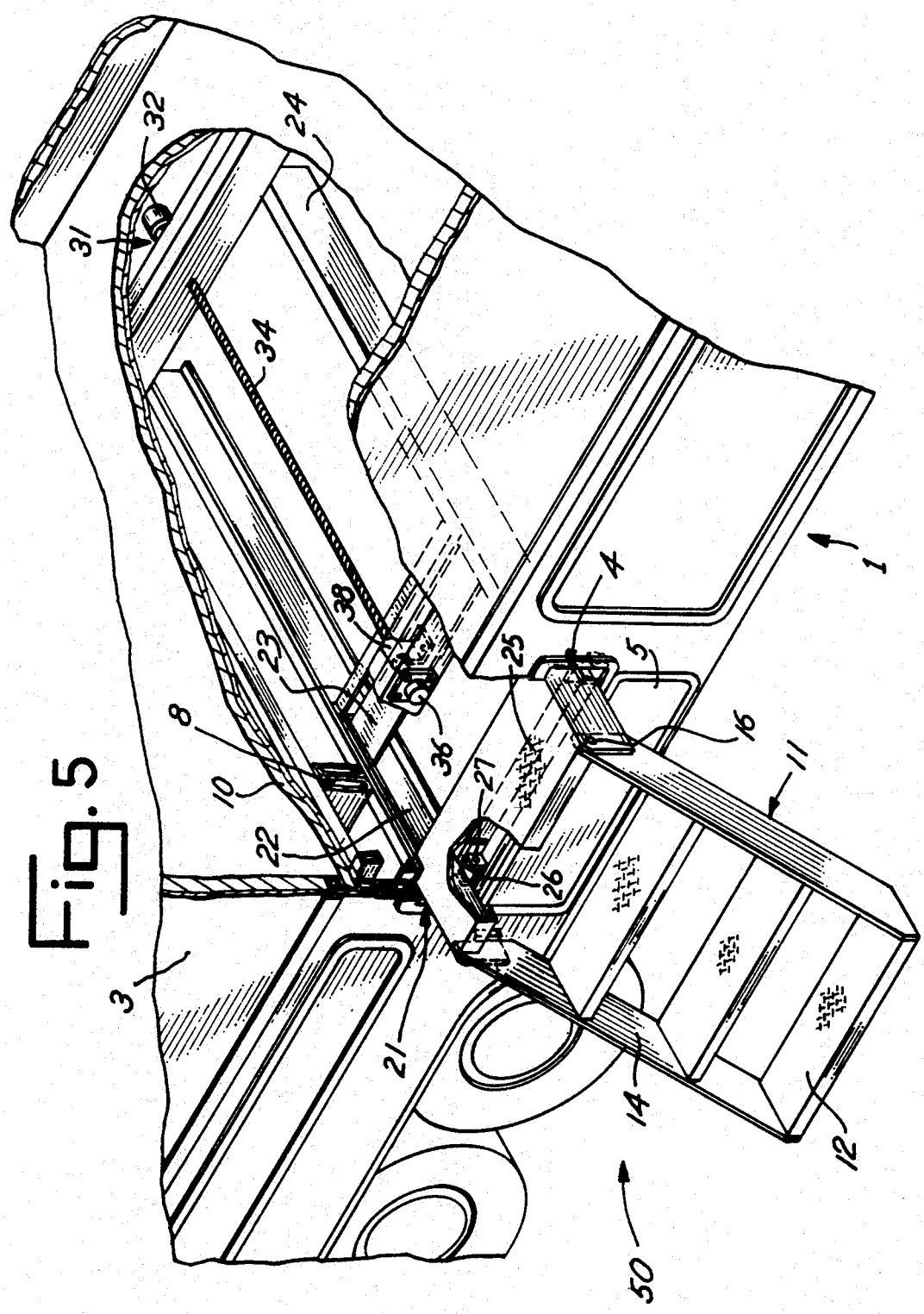

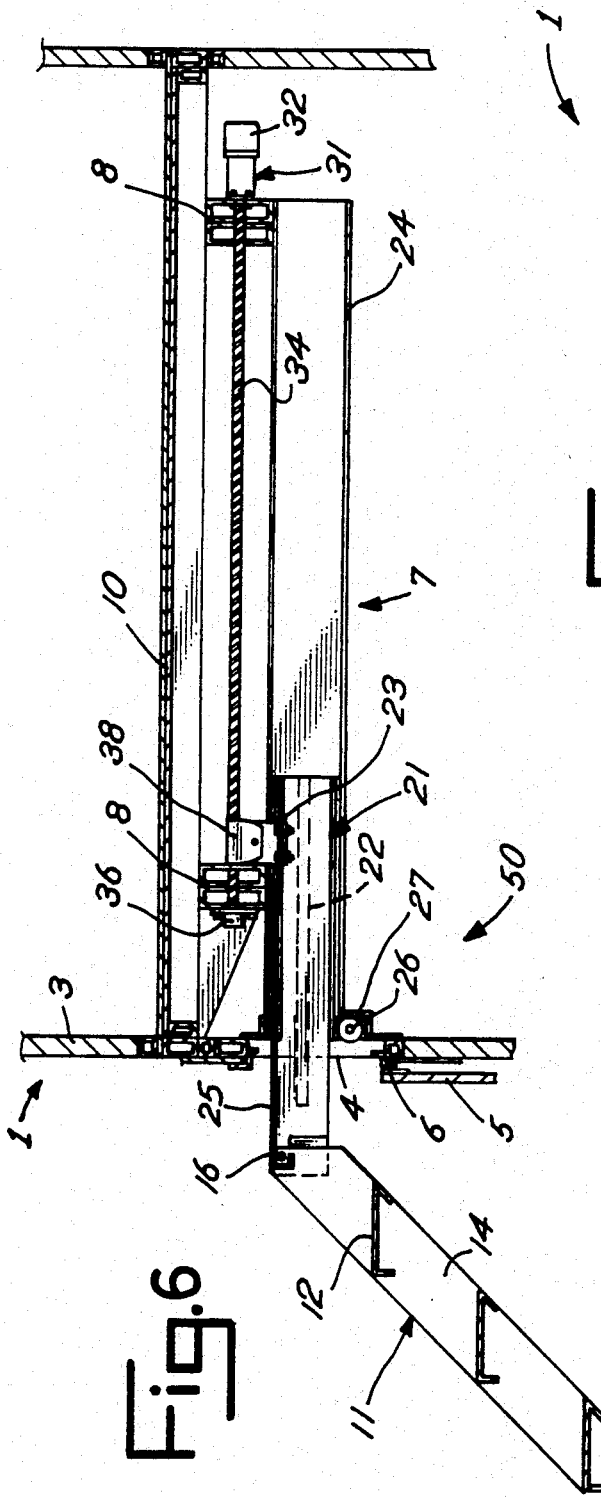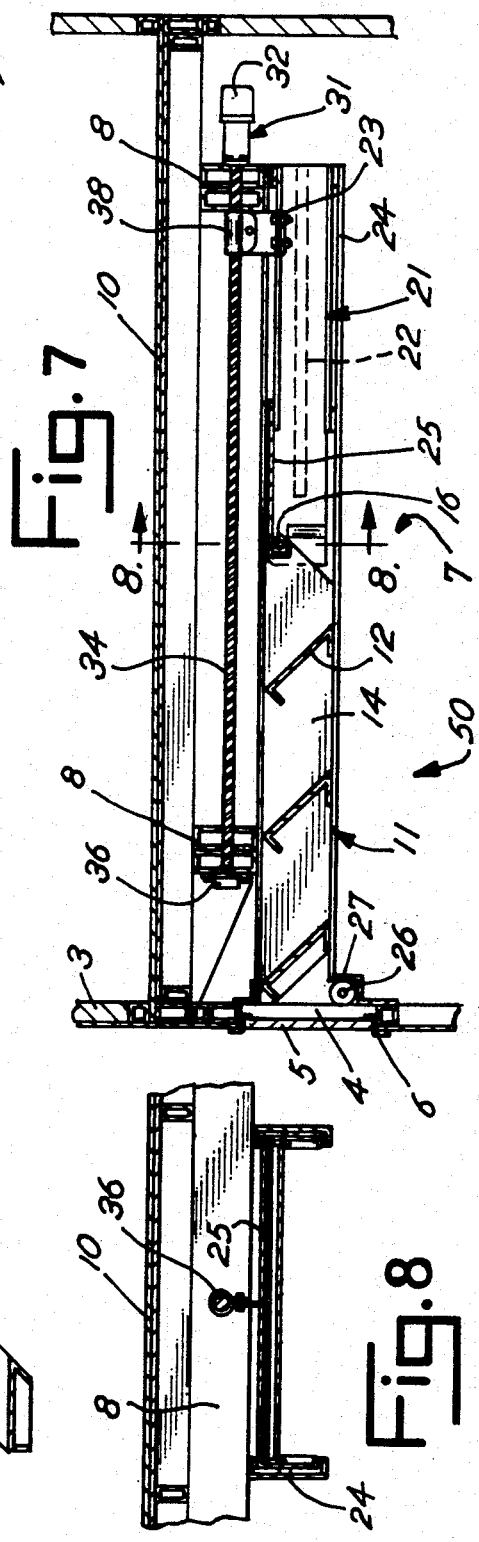

RETRACTABLE VEHICLE STEP

FIELD OF THE INVENTION

This invention relates to a retractable vehicle step ladder, and will have special application to a retractable step ladder for use in vehicles, such as recreation vehicle.

SUMMARY OF THE INVENTION

The recreational vehicle industry has long employed ladders and step assemblies to assist entry and exit from the vehicles. Since a significant portion of the RV market is comprised of the retired and elderly, the advantages of a automated step assembly are clear. In practice, the conventional ladders and steps require the user to manually remove the step or ladder from its storage area, usually underneath the flooring of the vehicle, and position the step or ladder at the foot of the vehicle's entry way. In many cases the user must exit the vehicle through the entry way without the aid of the step assembly in order to move the step into position for further use.

This invention provides a means for automatically positioning steps into operational position at the foot of the entry way from a stored position under the vehicle flooring. The user can extend or retract the ladder step from either the inside or the outside of the vehicle without manually handling the ladder step assembly itself. The step assembly is housed in the undercarriage of the vehicle and behind a door in the side wall of the RV, providing a cosmetically attractive accessory. The ladder step assembly uses a design of few moving parts, which keeps production cost low.

Accordingly, an objective of this invention is to provide a novel ladder step assembly for a vehicle that can be placed into an operational position without manually positioning the ladder steps.

Another object of this invention is to provide a ladder step that can be shifted between a stored or operational positions before entering or exiting the vehicle or fifth wheel.

Other objectives of this invention will become apparent upon a reading of the following description.

BRIEF DESCRIPTION OF THE DRAWINGS

A preferred embodiment of the invention has been chosen for purposes of illustration wherein:

FIGS. 1-4 are a progressive perspective view of the ladder step moving from a concealed storage position (FIG. 1) inside the vehicle to the operational position (FIG. 4) at the foot of the entry way.

FIG. 5 is a perspective view of the ladder step with a section of the vehicle wall and floor, cut away for illustrative purposes, revealing the integral mechanisms of the ladder step.

FIG. 6 is a sectional side view of the ladder step in its operational position.

FIG. 7 is a sectional side view of the ladder step in its storage position.

FIG. 8 is a cross-sectional view of the ladder step taken along lines 8—8 of FIG. 7.

DESCRIPTION OF THE PREFERRED EMBODIMENT

The preferred embodiment herein described is not intended to be exhaustive or to limit the invention to the precise form disclosed. It is chosen and described to explain the principles, application and practical use of the invention to thereby enable others skilled in the art to utilize the invention.

In this invention, as seen in FIG. 1-5, the ladder step assembly 50 is shown in use with a recreational vehicle 1. In the retracted storage position, FIGS. 4 and 7, the ladder step assembly 50 is positioned under the floor 10 in the undercarriage area 7 of the vehicle 1. The ladder step assembly 50 is extended into its operational position through a side opening 4 in the side of the vehicle 1. The side opening 4 is covered by a door 5. A hinge 6 attaches door 5 to the vehicle wall 3, allowing the door 5 to open downward. In the operational position, FIGS. 1 and 6, the step assembly 50 extends diagonally from the bottom of the vehicle entry 2 way to the ground.

Ladder step assembly 50 has a stair case 11, slider 21 and driver 31. The stair case 11 extends diagonally down to the ground, and includes steps 12 cross connected between two casings 14. The step side casings 14 are of sufficient width to accommodate the breadth of steps 12. Steps 12 have a front edge and back edge and flat top surface. The steps 12 are affixed diagonally to the step side casings 14 so that in the operational position of the assembly, the steps are substantially parallel to the ground. The step side casings 14 define the rise and run to the stair case 11 in its operational position. The number of steps 12 is generally three but can vary with the require rise and run of the step assembly application.

The stair case 11 is pivotally connected at its upper edge to slider 21 by pins 16 which attach the step side casing 14 and the two side walls 22 of the slider together. Slider 21 includes a top wall 18 which extends between the two slider side walls 22 at the front of the slider to provide a stable platform just at the foot of the vehicle entry way 2. A cross member 23 connects the two slider side walls 22 at the rear end of slider 21.

Two parallel horizontal slide rails 24 are connected parallel beneath the flooring 10 to the vehicle frame 8 and extend from opening 4 across a portion of the width of the undercarriage of the vehicle 1. The slide rails 24 are each C-shaped in cross-section and located in an opposing relation. The stair case 11 and slider 21 ride horizontally within slide rails 24 as best shown in FIG. 8, supported by the rails and rollers 26. Roller 26 is secured at the front edge of each rail 24 and acts as the point of contacting lift for the stair case as it shifts between its extended or operational and retracted or stored positions. Two roller brackets 27 are mounted below slider rails 24 at the base of opening 4. The roller brackets 27 journal slide rollers 26. The top edges of slide rollers 24 are positioned level to or slightly higher than the lower surface of slide rails 24.

A drive motor 32 is attached to the vehicle frame 8. Drive motor 32 has a worm drive shaft 34 that passes through the vehicle frame 8 connecting to bearing 36 attached to vehicle frame 8. The drive shaft 34 carries a worm gear bracket 38, which moves horizontally back and forth along shaft 34 as the drive motor 32 runs. Bracket 38 is connected to the slider rear cross member 23 to cause the slide 21 and stair case 11 to move within and along rails 24 in conjunction with the movement of brackets.

In operation from the storage position to the operational position, drive motor 32 when activated from within or exteriorly of vehicle 1 rotates the drive shaft 34 to urge bracket 38 from the rear to the front of rails 24, extending along the slide rails 24, stair case 11 from the undercarriage area 7 through side opening 4. As stair case 11 moves over slide rollers 26, the bottom end of the stair case 11 rotates about pivot pins 16 into its operational position seen in FIG. 6. A limit switch (not shown) cuts off the power to motor 32 when bracket 38 approached its outer limit. A cross member 25 is connected across the front of slide side walls 22 and acts as a stop for stair case 11, which may or may not make ground contact. Slider top wall 18 acts as a platform.

In operation from the operational position to the storage position, the drive motor 32 is reversed in activation to rotate the drive shaft to urge bracket 38 from the front to the rear of rails 24, retracting stair case 11 into the undercarriage area 7. As stair case 11 moves toward vehicle side opening 4 the step side casings 14 contact the slide rollers 26 and rotate upward about the step pivot pin 16 into a horizontal position. The drive motor 32 continuously pulls the step assembly into undercarriage area 7. Another limit switch (not shown) stages the advancement of the stair case 11 by deactivating motor 32. Door 5 can be spring loaded closed so that it will open and close upon contacting stair case 11.

While this present invention illustrates a worm drive system to activate the extension and retraction of the stair case, other alternative drive systems may be used. Such alternative drive systems would including a motorized pulley system using link chains or belts.

It is understood that the above description does not limit the invention to the embodiment herein described, but that it may be modified within the scope of the appended claims.

I claim:

1. In combination, a vehicle and a ladder assembly for entering and exiting said vehicle, said combination wherein said vehicle includes an undercarriage, said ladder assembly including a stair case with steps and a slide, said slide retained between rails carried by said undercarriage for shiftable movement between a retracted position within said vehicle and an extended position located nearer the exterior of said vehicle, said stair case pivotally connected to one end of said slide and being shiftable between a stored position within said vehicle when said slide is in its said retracted position and an operational position exterior of said vehicle in a downward orientation when the slide is in its extended position having its said one end protruding outwardly from said vehicle in which said stair case can be used to descend from and enter said vehicle, said one slide end constituting step means from which to descend said stair case, and drive means for shifting said slide between said retracted and extended positions.

2. The combination of claim 1, wherein said vehicle includes an opening into the interior of said undercarriage and a door for covering the opening into said undercarriage.

3. The combination of claim 1 wherein said vehicle includes an opening into the interior of said undercarriage, said rails extending to said opening, rollers rotatably connected to said rails at said opening, said rollers constituting means for supportingly contacting said stair case as it pivots relative to said slide when the stair case shifts into or from its operational position.

4. In combination, a vehicle and a ladder assembly for entering and exiting said vehicle, said combination wherein said vehicle includes an undercarriage, and an opening into the interior of said undercarriage and a door for covering the opening into said undercarriage, said ladder assembly including a stair case with steps and a slide, said slide retained between rails carried by said undercarriage for shiftable movement between a retracted position with said vehicle and an extended position located nearer the exterior of said vehicle, said stair case pivotally connected to said slide and being shiftable between a stored position within said vehicle when said slide is in its said retracted position and an operational position exterior of said vehicle in a downward orientation when the slide is in is extended position in which said staircase can be used to descend from and enter said vehicle and drive means for shifting its said slider between said retracted and extended positions, said rails extending to said opening, rollers rotatably connected to said rails at said opening, said rollers constituting means for supportingly contacting said stair case as it pivots relative to said slide when the stair case shifts into or from its operational position, said drive means includes a motor and transmission means, said motor being mounted to said under carriage, said transmission means including a screw shaft and a worm gear and a bracket connected to said slide, said worm gear rotatably attached to said screw shaft and connected to said bracket, whereby operation of said motor rotates said screw shaft causing said worm gear to traverse across said shaft to shift said slide between its said retracted position within said undercarriage and said extended position.

* * * * *